US008625763B2

(12) United States Patent
Boyd et al.

(10) Patent No.: US 8,625,763 B2
(45) Date of Patent: Jan. 7, 2014

(54) TELECOMMUNICATIONS CALLS

(75) Inventors: Ivan Boyd, Ipswich (GB); Robert M Claxton, Ipswich (GB); Stephen A Cassidy, Ipswich (GB)

(73) Assignee: British Telecommunications PLC, London (GB)

(*) Notice: Subject to any disclaimer, the term of this patent is extended or adjusted under 35 U.S.C. 154(b) by 1442 days.

(21) Appl. No.: 12/294,251

(22) PCT Filed: Feb. 28, 2007

(86) PCT No.: PCT/GB2007/000694
§ 371 (c)(1),
(2), (4) Date: Sep. 24, 2008

(87) PCT Pub. No.: WO2007/113459
PCT Pub. Date: Oct. 11, 2007

(65) Prior Publication Data
US 2009/0136012 A1 May 28, 2009

(30) Foreign Application Priority Data
Mar. 30, 2006 (EP) .................................... 06251793

(51) Int. Cl.
*H04M 1/56* (2006.01)
(52) U.S. Cl.
USPC .................................. 379/142.15; 379/88.13
(58) Field of Classification Search
USPC ................. 379/412.15, 88.13–88.14, 142.15; 370/352–356; 455/566
See application file for complete search history.

(56) References Cited

U.S. PATENT DOCUMENTS

| 4,932,021 A | 6/1990 | Moody |
| 4,987,587 A | 1/1991 | Jolissaint |
| 5,128,981 A | 7/1992 | Tsukamoto et al. |
| 5,220,599 A | 6/1993 | Sasano et al. |
| 5,537,470 A | 7/1996 | Lee |
| 5,631,948 A | 5/1997 | Bartholomew et al. |
| 5,699,412 A | 12/1997 | Polcyn |

(Continued)

FOREIGN PATENT DOCUMENTS

| EP | 0802661 A2 | 10/1997 |
| EP | 0 869 688 | 10/1998 |

(Continued)

OTHER PUBLICATIONS

International Search Report mailed Aug. 16, 2006 in PCT/GB2006/001145.

(Continued)

*Primary Examiner* — Simon Sing
(74) *Attorney, Agent, or Firm* — Nixon & Vanderhye PC

(57) ABSTRACT

A user accesses a destination such as a call center. The call center generates a record for insertion into the user's personal address book, with a telephone number of the center and metadata concerning a transaction. To place a later call on the same matter, the user selects, either using his telephone or via a separate terminal, the address book entry and the call is made. The center receives the user's telephone number via the calling line identity (CLI) and translates this into a data address so that it can "pull" the metadata from the personal address book. Alternatively the server can translate the center's telephone number into a data address to "push" the metadata to the center.

22 Claims, 6 Drawing Sheets

(56) References Cited

U.S. PATENT DOCUMENTS

| | | | |
|---|---|---|---|
| 5,832,061 A * | 11/1998 | Rubin | 379/88.1 |
| 5,923,733 A | 7/1999 | Binns et al. | |
| 6,091,808 A | 7/2000 | Wood et al. | |
| 6,215,857 B1 | 4/2001 | Kasiviswanathan | |
| 6,289,084 B1 | 9/2001 | Bushnell | |
| 6,301,349 B1 | 10/2001 | Malik | |
| 6,317,491 B1 * | 11/2001 | Chang et al. | 379/142.01 |
| 6,327,344 B1 | 12/2001 | Paxson | |
| 6,327,359 B1 | 12/2001 | Kang et al. | |
| 6,442,251 B1 * | 8/2002 | Maes et al. | 379/93.23 |
| 6,542,489 B1 * | 4/2003 | Kari et al. | 370/338 |
| 6,549,619 B1 | 4/2003 | Bell et al. | |
| 6,603,840 B2 * | 8/2003 | Fellingham et al. | 379/93.23 |
| 6,687,242 B1 | 2/2004 | Enzmann et al. | |
| 6,792,102 B2 | 9/2004 | Shires | |
| 6,970,692 B2 * | 11/2005 | Tysor | 455/405 |
| 7,058,393 B2 * | 6/2006 | Sugane | 455/414.1 |
| 2002/0057677 A1 | 5/2002 | Katzschner et al. | |
| 2002/0110224 A1 | 8/2002 | Kovales et al. | |
| 2002/0118811 A1 | 8/2002 | Davis et al. | |
| 2002/0126805 A1 | 9/2002 | Finnigan | |
| 2003/0009434 A1 | 1/2003 | Munn et al. | |
| 2003/0018722 A1 * | 1/2003 | Almeda et al. | 709/206 |
| 2003/0041303 A1 | 2/2003 | Milton | |
| 2003/0091167 A1 * | 5/2003 | Hirai | 379/93.01 |
| 2003/0099341 A1 | 5/2003 | Williams | |
| 2003/0103457 A1 * | 6/2003 | Moran et al. | 370/230 |
| 2003/0169866 A1 | 9/2003 | Williams et al. | |
| 2004/0014456 A1 * | 1/2004 | Vnnen | 455/413 |
| 2004/0235520 A1 | 11/2004 | Cadiz et al. | |
| 2004/0266414 A1 | 12/2004 | Likwornik | |
| 2004/0266415 A1 | 12/2004 | Belkin et al. | |
| 2005/0063530 A1 | 3/2005 | Cook et al. | |
| 2005/0105705 A1 | 5/2005 | Elcock et al. | |
| 2005/0166154 A1 | 7/2005 | Wilson et al. | |
| 2005/0175172 A1 * | 8/2005 | Janssen | 379/440 |
| 2005/0243982 A1 * | 11/2005 | Starbuck et al. | 379/88.23 |
| 2005/0249344 A1 | 11/2005 | Mueller et al. | |
| 2007/0168428 A1 | 7/2007 | Clift et al. | |

FOREIGN PATENT DOCUMENTS

| | | |
|---|---|---|
| EP | 0 869 688 A2 | 10/1998 |
| EP | 1 122 938 | 8/2001 |
| EP | 1229750 A1 | 8/2002 |
| EP | 1 169 866 A2 | 1/2006 |
| EP | 1 619 866 | 1/2006 |
| JP | 2001189803 | 7/2001 |
| WO | 97/37499 | 10/1997 |
| WO | 99/27700 | 6/1999 |
| WO | 01/19059 A1 | 3/2001 |
| WO | 01/59595 A2 | 8/2001 |
| WO | 02/25403 A2 | 3/2002 |
| WO | 03/047230 A1 | 6/2003 |
| WO | 2004/054209 A2 | 6/2004 |
| WO | 2006/103427 A1 | 10/2006 |

OTHER PUBLICATIONS

U.S. Appl. No. 10/581,997, Clift et al., filed Jun. 7, 2006.
International Search Report dated Mar. 14, 2005.
http://theregister.co.uk/content/5/32999.html.
Notice of Allowance and Fee(s) Due dated Dec. 16, 2009 in U.S. Appl. No. 10/581,997.
International Search Report for PCT/GB2007/000694 mailed Aug. 22, 2007.
Rabiner L. et al., "Application of Isolated Word Recognition to a Voice Controlled Repertory Dialer System," IEEE International Conference on Acoustics, Speech, and Signal Processing, ICASSP '80, vol. 5, Apr. 1980, pp. 182-185.

* cited by examiner

TELECOMMUNICATIONS CALLS

This application is the U.S. national phase of International Application No. PCT/GB2007/000694 filed 28 Feb. 2007 which designated the U.S. and claims priority to European Patent Application No. 06251793.3 filed 30 Mar. 2006, the entire contents of each of which are hereby incorporated by reference.

TECHNICAL FIELD

Certain example embodiments of the present invention are concerned with making calls in a telecommunications system, and particularly, though not exclusively, with the making of telephone calls.

BACKGROUND AND SUMMARY

Telephone users, when contacting an organisation, especially via a call centre, are often frustrated by finding that for numerous reasons they cannot complete a transaction in one session. Either the user needs to phone the call centre again with more information or the call centre promises to call back but fails to do so. Either way, the user has to make a further telephone call to the call centre to follow up the transaction and often has to negotiate a second time a sequence of spoken menus each requiring a keyed (DTMF) input to reach the right department and then has to explain afresh the status of the earlier enquiry.

It is known for a call centre to receive a customer's calling line identifier (CLI) and to use it to determine which agent station an incoming call is to be routed to (U.S. Pat. No. 4,987,587; U.S. Pat. No. 5,537,470 specifically for a disconnected caller; WO2004/054209).

It is also known for a call centre to receive a customer identity via user input and to use it to determine which agent station an incoming call is to be routed to (U.S. Pat. No. 4,932,021; U.S. Pat. No. 5,537,470 (telephone credit card no. as identifier)).

It is known for a call centre to receive a customer's CLI and to use it to retrieve customer data (U.S. Pat. No. 6,327,359).

In click-dial systems where a user clicks a button on a web page to set up a phone call to the call centre, it is known to prompt the user to enter data such as account number, phone number etc. (U.S. Pat. No. 6,792,102: also the web server records the identity of agent participating in a web session so that phone call can be routed to the same agent).

The present invention is defined in the claims.

BRIEF DESCRIPTION OF THE DRAWINGS

Some embodiments of the invention will now be described, with reference to the accompanying drawings, in which.

DETAILED DESCRIPTION

Figure 1:
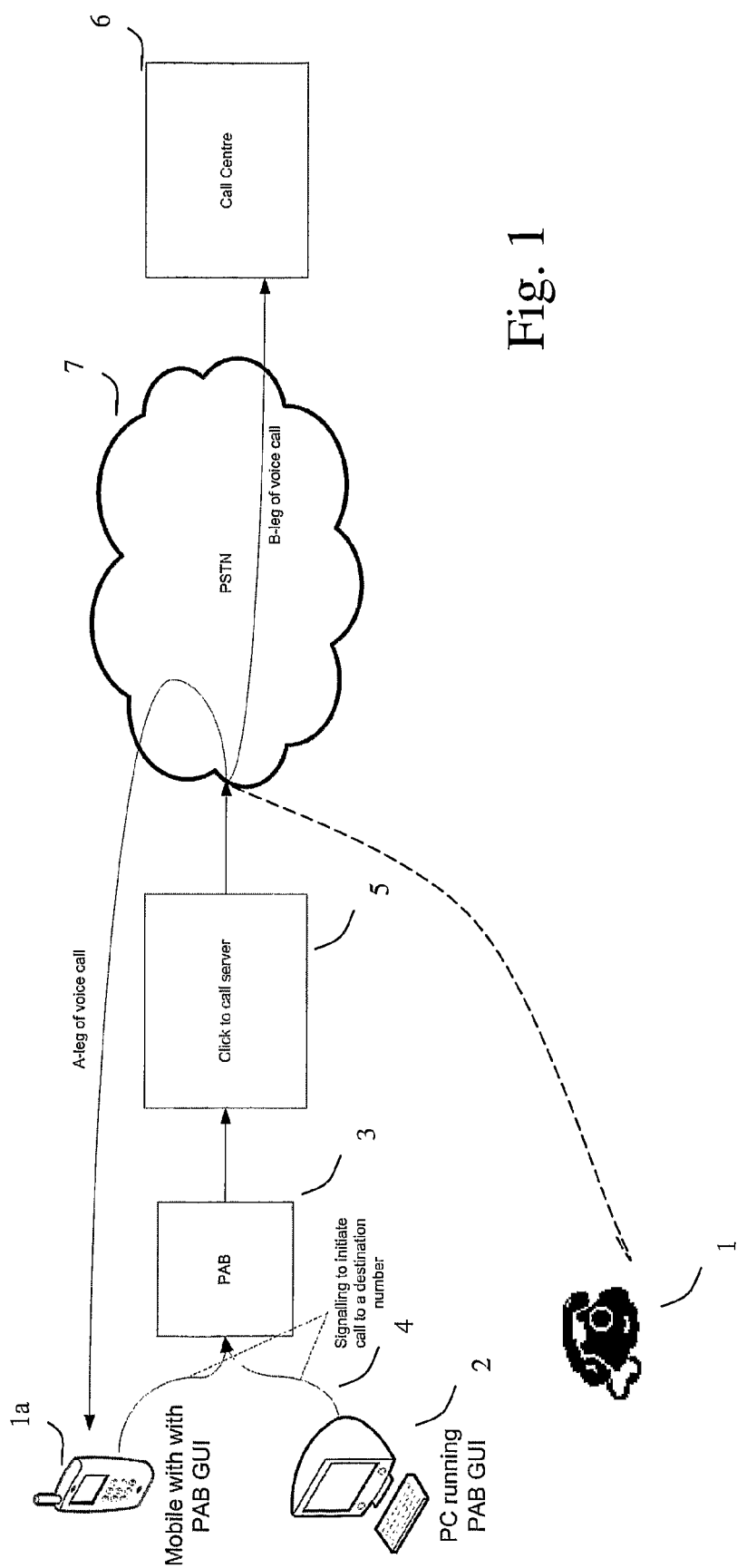
FIG. 1 is a diagram of a telecommunications network.

In a first embodiment of the invention, shown in FIG. 1, a user has a telephone 1 and a computer terminal 2. A server 3 provides a personal address book facility to the user (and to other users). The heart of the personal address book (PAB) is a data store in which are stored, for the particular user, a set of entries each containing the name of a person or organisation along with the telephone number of that person or organisation. The expression "personal address book" is used here as it is the conventional term in the art: it should, however be noted that for the purposes of the present invention the address of the person or organisation is not needed and thus the address book may not actually contain any addresses at all. The manner in which these entries are generated will be described later.

The user uses his computer terminal to access the server, via a suitable data network 4 such as the internet. It is assumed that the user would go through some logon/authentication process to gain access to this PAB functionality (not shown in any of the diagrams).

The user's terminal and the PAB server provide him with a graphical user interface (GUI) by which he may then view the address book entries—or at least the names that they contain—upon the terminal and select a name to which he wishes to make a telephone call, e.g. by clicking upon it. This sends a command to the PAB which retrieves the telephone number and initiates a telephone call to the chosen destination, via a call server 5. The call server sets up a telephone call between the telephone and the desired destination (which, in this example, is a call centre 6) via the public switched telephone network (PSTN) 7. It will be understood that this functionality, as we have so far described it, is conventional. We have not, therefore, described in detail the software that is provided for this purpose on the servers and the terminal.

It is assumed that the PSTN supports the signalling of calling line indication (CLI) and the click to call server 5 implementing the PAB/click-to-call service can set the Calling Line Identity that is presented to the destination to correspond to the directory number of the user's telephone.

For the purposes of discussion, suppose that the PAB entry corresponding to the organisation running the call centre 6 has been placed in the PAB because the user has previously contacted the organisation, and suppose further that it is desired that the call centre should, upon receipt of the call that is related to the previous transaction, route the call to the same operator who dealt with it previously (or to an operator who is familiar with that type of transaction) and/or to retrieve data relevant to the previous transaction for presentation to the operator so that he or she can deal more effectively with the call.

For this purpose, metadata are stored in the PAB. In this example the metadata stored are the telephone extension number of the operator who dealt with the transaction previously, and a transaction number which identifies the transaction so that the call centre can, using the transaction number, retrieve the data. As an alternative to the extension number, the call centre could, in order to allow for the possibility that the same extension may be used by different agents at different times, instead store an identifier specific to the agent that handled the call previously and use its call centre functionality to locate that agent. The nature of the metadata may vary: for example it could consist solely of a transaction number so that the call centre has to look up the extension number too; conversely it may contain all the required data so that the call centre does not have to look up its own records. In the latter case, the call centre can avoid storing large quantities of personal data on their customers instead relying on the customer to provide and manage the storage. Therefore a highly personalised and customised service can still be provided to the end user but without the burden of information storage and management. Moreover the user can have control over the metadata that is disclosed.

In an alternative implementation, the user may have a mobile phone 1a with a graphical user interface: in this case the mobile phone GUI can take the place of the computer terminal. The operation of this version will not be described separately as it is substantially identical to that already described. The GUI might suitably communicate with the PAB using the http protocol, and the SyncML format (particulars of which are available from the Open Mobile Alliance).

When the PSTN call is set up, the call centre receives the CLI of the originating user. We will now describe two alternative mechanisms whereby the metadata are also conveyed to the call centre.

Figure 2:
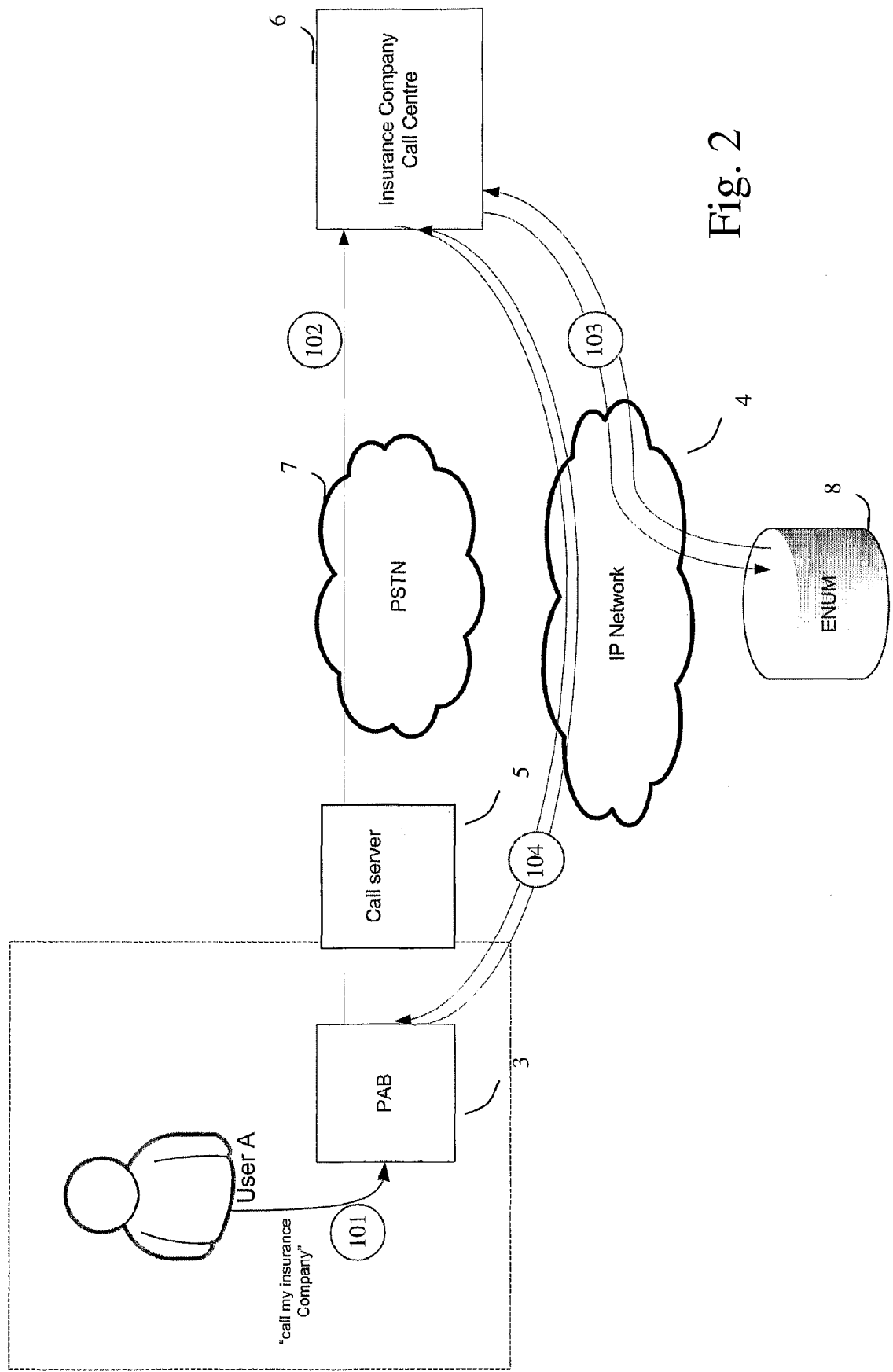
FIGS. 2, 4, and 6 are diagrams illustrating various modes of operation of the network of FIG. 1.

Both of these mechanisms require the use of a further server 8 in FIG. 2 that provides translation of a telephone number into an associated data network address. In this example it will be assumed that this server is an ENUM server which (as described in IETF documents RFC2916 and RFC3761) uses a translation mechanism like the Domain Name System (DNS) to translate an E.164 number (i.e. a conventional telephone number) into a data address. We assume for the purposes of this description that the data address is a Uniform Resource Locator (URL), such as an LDAP address.

Figure 3:
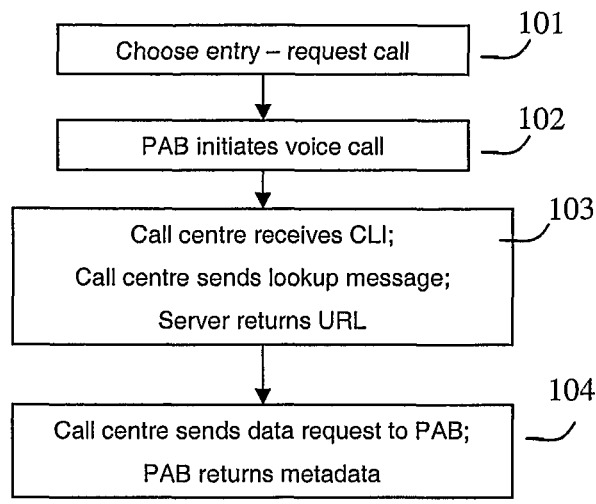
FIGS. 3 and 5 are flowcharts showing processes for conveying metadata to the call centre, in accordance with certain example embodiments.

The process, starting from the beginning, is shown in the flowchart of FIG. 3. Here we suppose that the call centre is that of an insurance company.

Step 101—the user interacts with the PAB 3, as described above, to initiate a call to the insurance company. The user has a policy with this company, details of which are stored in the PAB in an entry associated with the phone number of the company. The details that are stored could take a variety of different forms. For example, a simple key that uniquely identifies the user within the insurance company's systems. Or, the details might explicitly contain information such as the type of policy held, the expiry date of the policy and the date of the last call from the end user. In other words, the information stored might be a pointer to data held by the insurance company or it might be additional information that is not held by the company.

Step 102—the PAB initiates a voice call to the insurance company via the PSTN. The CLI of the call is set to be the telephone number of the user. Also, the PAB flags the chosen entry as "call in progress".

Step 103—the call centre 6 of the insurance company receives the incoming call and sends, via the internet 4, a request to the ENUM server 8 to perform a lookup into the ENUM database using the CLI. In this case, the server returns the URL of the user's PAB.

Step 104—the insurance company call centre 6 establishes a data connection to the end user's PAB, using the address obtained in step 103 and sends to the PAB 3 a request stating the call centre's phone number. (If the URL is a general one for the PAB server rather than one specific to that user's PAB it may also send the telephone number of the user). The PAB uses this information to retrieve the metadata from the PAB entry, and sends it to the call centre. Note that, if the PAB contains more than one entry matching the call centre's phone number, it will extract the metadata from the one that is flagged "call in progress". The call centre can now use this information, for example, to customise voice menus that are presented to the user, route the call to the appropriate department or retrieve other information associated with the user that is stored within the call centre's systems.

Figure 5:
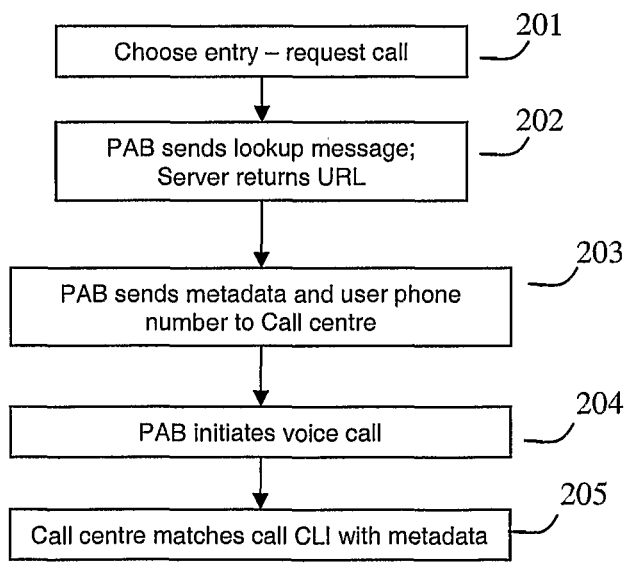
Figure 4:
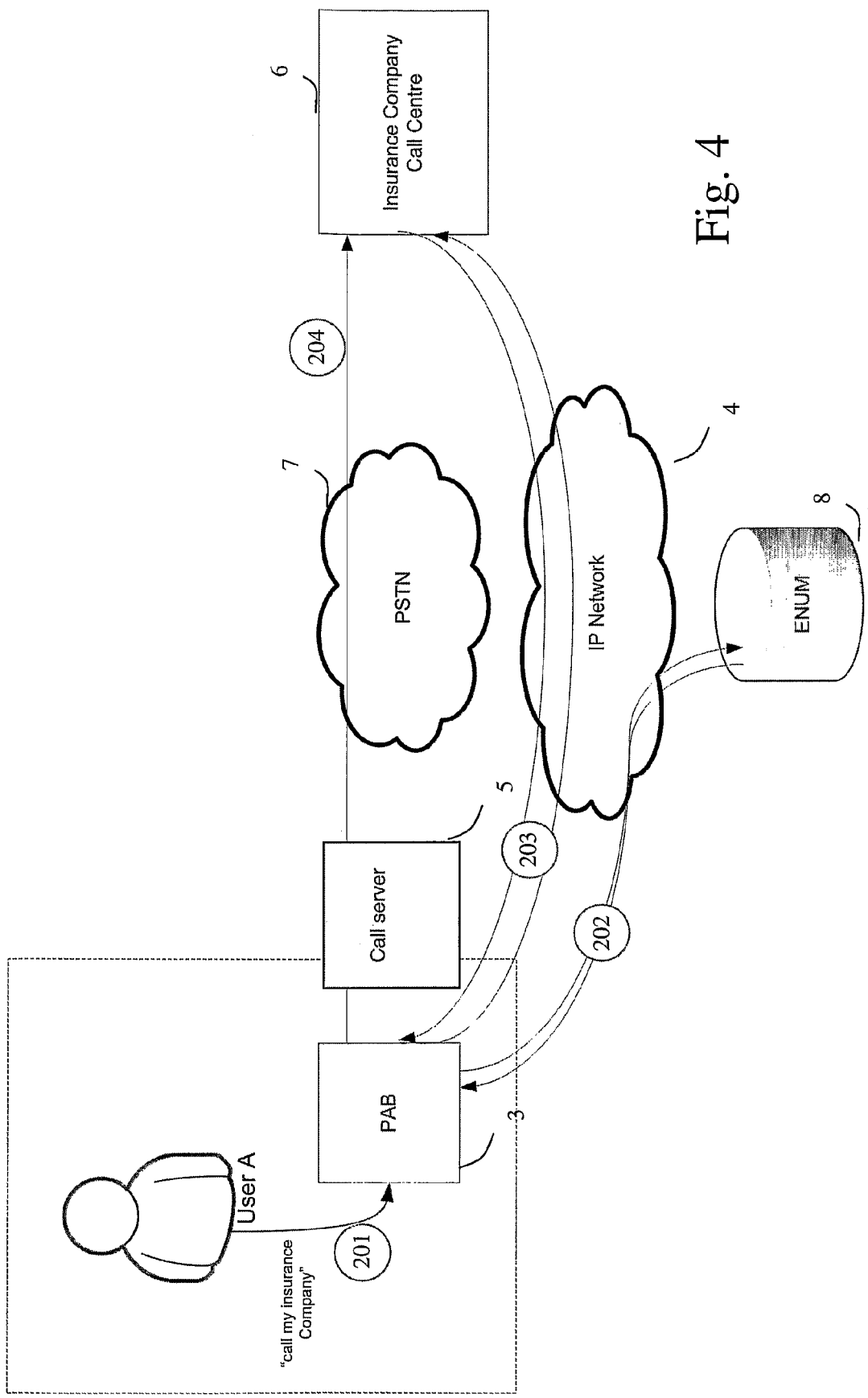

Alternatively, the PAB itself may take the initiative, as shown in FIG. 4 and the flowchart of FIG. 5.

Step 201—as in Step 101 above, the user selects the PAB entry corresponding to the number he wishes to call; the PAB retrieves the telephone number of the insurance company call centre, and the associated metadata.

Step 202—The PAB performs a lookup via the network 4 into the server 8 (e.g. an ENUM database) using the telephone number of the insurance company call centre. The lookup returns an address (e.g. a URL) relating to the call centre. If desire, this could be cached at the PAB to reduce the number of lookups.

Step 203—the PAB establishes a data connection via the network 4 to the call centre 6 using the address obtained in Step 202 and pushes the information stored in the PAB entry relating to the insurance company together with other details identifying the user that the information relates to (e.g. the personal telephone number of the user). The call centre stores such messages in a buffer store.

Step 204—the PAB initiates a voice call to the insurance company via the PSTN 7. The CLI of the call is set to be the telephone number of the end user and allows the call centre to look for a matching entry in its buffer store and thereby associate the incoming telephone call with the information it received in step 203. The call centre can now use the information obtained in step 3 in any of the ways outlined in Step 104, above.

FIGS. 2 and 4 illustrate two basic mechanisms by which the call centre can gain access to relevant information stored in the end user's PAB. The first is essentially a "pull model", i.e. the call centre pulls the information from the PAB, having first discovered an address for the PAB. The second mechanism is essentially a "push model", i.e. the PAB pushes the information to the call centre, prior to the associated voice call being received.

Clearly, variations on both these models are possible. For example in the pull model, upon being contacted by the call centre, the PAB might also perform an ENUM lookup in order to obtain information that allows it to verify that the source of the contact has some association with the telephone number of the call centre.

Also, although the above description has been give in terms of a PAB 3 located at some point remote from the user, it is equally possible to obtain the same functionality with a PAB within the user's computer terminal 2 or phone 1a.

Figure 6:
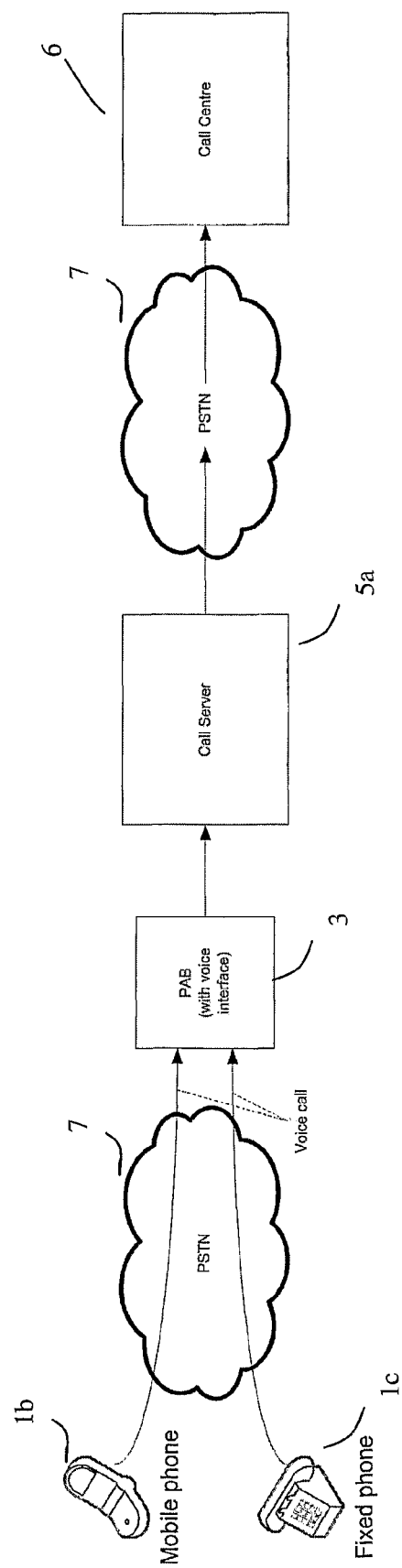

FIG. 6 shows an alternative version in which the user has only telephone access, in this case from a telephony device 1b, 1c which does not have any GUI functionality with which to access the PAB (for example, when using a basic, analogue telephone). Under these circumstances, the end user initiates a voice call to the PAB 3 (in much the same way that they might access a network-hosted voicemail service).

The PAB contains a speech synthesiser which provides a menu system (voice or DTMF driven) that allows the user to search the PAB and initiate calls as desired. The PAB interacts with a call server, connected to the PSTN in order to establish a call to the chosen destination. Therefore, in this case, a voice path exists between the end user, the PAB/call server and the destination. As shown, the voice path comprises two PSTN links; however the call server 5a could if desired be arranged instead to set up a single call, as in the case of FIG. 1, as is done in certain types of click-dial system, that provide the facility to set up a call in the network as required. An example of this is Wholesale Web Call Connect provided in the U.K. by British Telecommunications plc.

Figure 7:
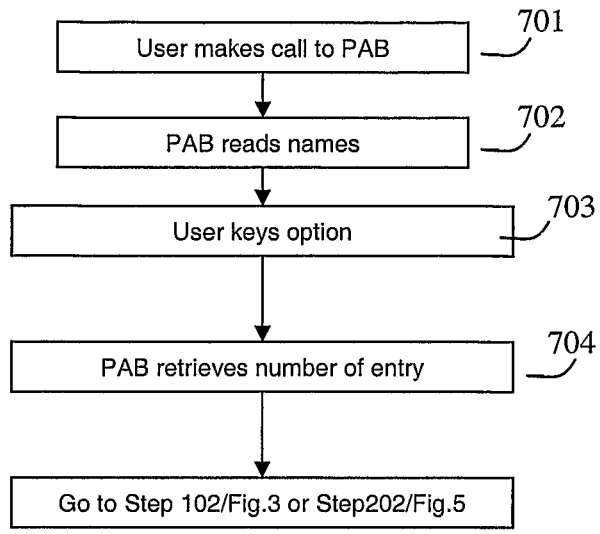
FIG. 7 is a flowchart showing example personal address book (PAB) related operations that proceed step 102 in FIG. 3 or step 202 in FIG. 5.

The flowchart of FIG. 7 shows the following steps:

701 The user, via the telephone 1b or 1c places a call to the PAB.

702 The PAB uses its speech synthesiser to read to the user a list of options: e.g. "For your home, press 1, for your office, press 2, for your doctor press 3, for your insurance company press 41 . . . "

704 The user keys the number for the option he requires on the telephone's DTMF (or other) keypad.

705 The PAB receives this signalling, interrupts the announcement, retrieves the telephone number of (in this case) the insurance company from the metadata, and then proceeds from Step 102 of FIG. 3 or 202 of FIG. 5.

The lookup mechanisms of FIGS. 2 and 4 apply to this case also.

The process just described is in many cases perfectly satisfactory. However, in cases where a number of people share a phone number, which is quite common in the case of fixed lines but can also occur in the case of mobile phones, it may cause ambiguity in the translation process at Step 103 or 202 if two people share a phone number but want to have separate personal address books. Also, in the second case, the system will not work as described if the user initiates the call from a telephone other than the one (or ones) registered at the ENUM server as associated with his PAB.

Thus, we prefer to set the CLI of the call to be the personal telephone number of the end user (e.g. 07000 123456). This number uniquely identifies the end user, regardless of the telephony device that they are actually using. It is in a sense a virtual telephone number in that although it is associated with a telephone it is not permanently associated with any particular telephone. This enables the system to distinguish between two users telephoning from the same telephone. Thus, members of a household effectively "share" the same fixed, telephone number but they could still be distinguished from each other using this system. Similarly, the user can telephone from any phone. Of course, it will be necessary for the user to identify himself or herself when accessing the PAB since the PAB will not be able to identify the user from the incoming CLI alone.

Another refinement is to maintain, for each telephone number, a record of whether it is unique to a particular user or is generic. Unique numbers would include a personal telephone number, and an ordinary telephone number that is de facto a personal telephone number because it belongs to a fixed telephone at an address where only one person lives, or is a mobile telephone used by only one person. Generic numbers would include the numbers of telephones routinely used by more than one person. The call centre 6, upon receiving a CLI, could then check the record to determine whether the CLI is recorded as being unique to a particular user. If it is, then it proceeds as previously described: if, on the other hand, the number is generic then the call centre can enter into an additional dialogue whereby the caller's identity may be ascertained. This record could be maintained at the call centre itself but more preferably would be in the server 8, so that, in the lookup process of FIG. 3, this information is obtained at Step 104. If desired the ENUM server could be modified to return two or more data addresses, each with an accompanying name, and the dialogue would serve to determine which name matches the caller.

We also envisage a version of this system without an address book, or at least, without the metadata. In this version the user makes an telephone call via a conventional PAB to the call centre, and the call centre determines whether the CLI is unique, as described in the preceding paragraph. Our preferred implementation of this version is one using CLI substitution by a personal telephone number, as described earlier. However, the "uniqueness lookup" could be used without CLI substitution, in which case it could even be used with phone calls dialed placed from a conventional telephone.

Figure 8:
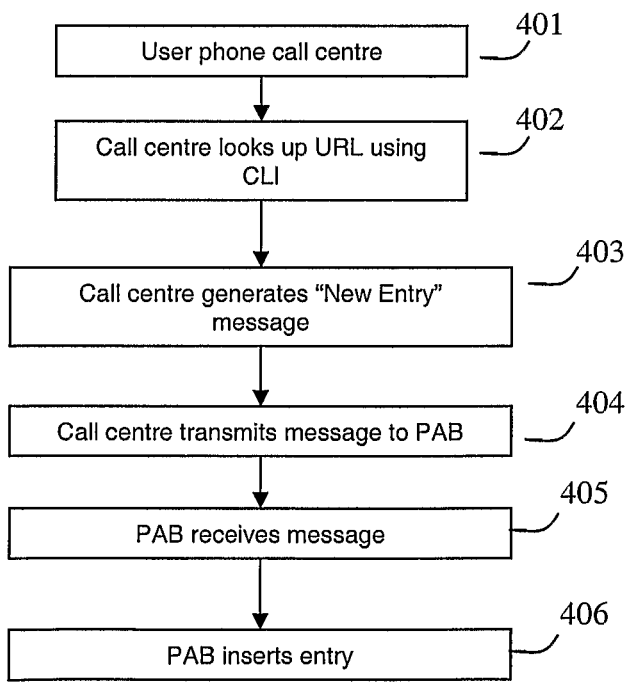
FIG. 8 is a flowchart illustrating an example approach for the generation of PAB entries.

We turn now to the question of generating PAB entries. One situation in which it may be desired to be generated is where the user telephones a call centre for the first time. It may well be convenient to create a PAB entry so that, should the user need to contact the call centre again on the same subject—for example to follow up progress of an order, or because the call has been interrupted. This process is depicted in the flowchart of FIG. 8.

In Step 401 the user makes a telephone call to the call centre. The call centre receives the user's CLI.

Step 402—the call centre performs a look-up to the ENUM server 8, as described in Step 103 above. It then has the URL of the PAB.

Step 403—the call centre generates a "new entry" message containing the user's telephone number and the entry that is to be added to the user's PAB. This entry contains, as mentioned above, the name of the organisation, the phone number of its call centre and a transaction number.

Step 404—the call centre transmits this message via the network 4 to the PAB.

Step 405—the PAB centre receives the message. At this point, if desired, security checks could be included. For example, the PAB could be arranged to, maintain a list of the names (or telephone numbers) of parties that the user has agreed are to be permitted to insert entries. An incoming message could then be checked against the list and message added only if the originator is on the list. Alternatively the user could be warned (via a voice announcement or via his computer terminal) of the attempt and given the opportunity to approve or not approve the proposed entry, so that the user is in control of the disclosure of information contained in the PAB.

Step 406—(if the security checks are passed) the entry is added to the PAB.

An alternative or additional security feature would be that the call centre would include its own data network address in its "new entry" message and the PAB, upon receiving it a would perform a lookup (as in Step 202) to translate the call centre's telephone number into its data address (or vice versa) and check that the result matches the data in the "new entry" message.

Where the user has a computer terminal in communication with the PAB, an alternative to sending the "new entry" message to the PAB would be to send to the user (e.g. by email) an XML formatted document that he could choose to allow (or not allow) PAB software to parse in order to update the PAB entry.

A less preferred option would be for the call centre to dictate, over the telephone a series of instructions for the user to type into his terminal.

As well as (or instead of) the PAB being populated and modified/updated in the course of voice call with the call centre, we can consider some more general scenarios. The simplest and most obvious is management of the PAB (via some suitable GUI or voice interface) by the user, e.g. to delete unwanted or incorrect information or to manually modify any general preferences they want to expose to call centres).

A second scenario is where the PAB is updated due to a related transaction that is, however not (yet) related to a voice call. For example, a user might click on a hyperlink on a web page or open an attachment in an email thus accessing information which is then stored against an appropriate entry in the PAB. This more general mechanism opens up some further usage scenarios:

- An email attachment could be created that provides a telephone number for a audio conference service together with information that identifies the specific conference to join. This information would be stored in the PAB against the entry for the conference service phone number. Initiating a call to this number would propagate the additional stored information to the audio conference service allowing the user to be automatically connected to the correct audio conference without the need to dial any special authorisation code.
- An email attachment or hyperlinked object might be created that acts like an electronic gift voucher. As before, the information would be stored in the PAB, associated with a telephone number. The gift voucher would be supplied to the call centre when a call was initiated to it via the PAB and could be used in some manner to provide an incentive to the end user.
- In a further PAB population scenario, an application program running on the user's personal computer might have access to populate and update that user's PAB. In one envisaged scenario, the application monitors the "health" of the user's computing system and network connections (e.g. to ensure all the relevant network services such as IP connectivity, DNS, email etc are working correctly). Information about the configuration and state of these services is stored in the PAB, in each case associated with the telephone helpdesk number of the relevant service provider. If some fault occurs and the end user initiates a call to one of the helpdesks via their PAB, the latest state of their computing system can be automatically provided to the helpdesk to aid in diagnosing the fault.

A further enhancement (which could be used in other scenarios) would be to encode an expiry time/date associated with the stored information. This data might be interpreted by the PAB or the call centre to determine whether the stored information is valid for use and/or whether it should be deleted. In the audio conference scenario, the stored information would expire after the scheduled conference time. Another possibility is that a call centre might, upon completion of a particular transaction, send a message to the PAB instructing it to delete the associated entry; or to replace it with a fresh entry.

Throughout the above, reference is made repeatedly to the destination of calls initiated from the PAB being a call centre. It should be understood that this represents just one envisaged scenario. In general, any suitably equipped destination could replace the call centre in these scenarios, i.e. a destination that is able to analyse the CLI of incoming calls, to make use of the metadata, and (where required by the particular embodiment of the invention) perform a lookup of the CLI in some data store and establish a data connection with the PAB for the purpose of retrieving, populating, updating or deleting information in the PAB.

Some security and privacy related issues have already been mentioned. In general, a variety of different, known mechanisms could be envisaged to address security concerns, in particular to ensure that the user's PAB is not accessed or updated without appropriate authorisation or checks taking place. These range from prompting the user before releasing or allowing update of PAB information through to use of mechanisms to verify the identity of, say, the call centre and ensure that it is only able to access and update entries that relate to it.

It will be important to provide controls such that the end user can selectively disclose information on the PAB to the call centre. In some cases they may want to release all relevant information in order to get the best possible experience. In other cases they may wish to appear "anonymously".

The basic concept of this system we have described is to augment basic PAB data (e.g. the address and phone number of a company) with other information stored against that entry in the PAB.

The nature of this additional, stored information is essentially unlimited but some example scenarios are provided below:

- Storage of product IDs, serial number etc. for products purchased from a company. This information could be used to allow the end user to be routed to the appropriate department and for product information to be automatically presented to the call centre agent.
- Storage of user preferences, either a global preferences or as preferences that are specific to any particular call centre. The end user could store such preferences in their PAB thus allowing these wishes to be presented to any call centre to act upon if they (a) "understand" them and (b) are able/willing to do so. Such user preferences might include preferred language or a preference for shortened voice menus.
- Storage of expiry date for an insurance policy. This information could be used to bias the voice menus presented to the user according to how close the expiry date is. For example, during the majority of the policy duration, it might be supposed that any call from this customer is more likely to concern a claim and hence the option to be routed to the claims department might be presented first. Towards the end of the policy, it might be supposed that a call from the customer is more likely to concern renewal of the policy and therefore the voice menus can be structured to present this option first.
- Storage of general user information, e.g. address details, not specific to any particular call centre. In this case, the user's address information can be provided electronically via the PAB so that it is immediately available to the call centre agent. This might be of particular benefit in the circumstances where the call is the first contact the user has had with a company, and hence none of their details are stored by that company.

The embodiments of the invention discussed above have been described on the assumption that the voice calls are made via the PSTN; however, they could equally well be implemented using the integrated services digital network (ISDN). Moreover, other types of telecommunications calls such as digital telephone (or even multimedia) calls can also be accommodated. Thus, in the case of voice calls over the internet (VoIP), the system operated in essentially the same manner, except that the equivalent of the caller's telephone number is his session initiation protocol (SIP) address, which (like the CLI) is conveyed to the recipient. Therefore, in a VoIP version references in the above description to the transmission or lookup of a CLI would be replaced by references to the SIP number.

What is claimed is:

1. A method of operating a telephone system comprising:
   a user accessing a store having a plurality of entries each containing a telephone number;
   upon selection by the user of an entry, setting up a call from telephone equipment of the user to destination telephone equipment identified by the telephone number contained in the selected entry, said call signaling to the destination telephone equipment a telephone number of the user;

wherein at least some of said entries also contain additional data, and the method further comprises:

upon receipt by the destination equipment of said call, translating said user telephone number into a data address for access means of the store and sending to said data address a request for additional data;

upon receipt, by said store access means, of said request, sending the additional data to the destination telephone equipment.

2. A method according to claim 1 in which the translation is performed by sending an enquiry message containing the telephone number to be translated to a remote server and receiving a reply message from the remote server.

3. A method according to claim 1 in which a data terminal of the user, located adjacent to said telephone equipment of the user, serves to access the store and to select an entry therefrom.

4. A method according to claim 1 in which the telephone equipment of the user includes a graphical user interface by means of which the user accesses the store and selects an entry therefrom.

5. A method according to claim 4 in which the store is located in the telephone equipment of the user.

6. A method according to claim 1 in which entries are translated by a speech synthesizer into audible form and transmitted to the telephone equipment of the user, and the user selects an entry by means of a keypad or via a speech recognizer.

7. A method according to claim 1 in which the store is located at a remote server.

8. A method according to claim 3 in which the store is located in the data terminal.

9. A method according to claim 1, further comprising determining, other than solely by reference to the telephone number of the said telephone equipment of the user, the user's identity and inserting into the call, as said telephone number of the user, a stored number, not being said telephone number of said telephone equipment of the user, that is recorded as associated with said identity.

10. A method of operating a telephone system, said telephone system including a store for storing, in respect of a user, a plurality of entries each containing a telephone number, and access means through which the user is able to consult the store and initiate the making of a telephone call to a destination corresponding to a telephone number stored therein, the method comprising:

making a telephone call from a user station to a destination station, said call signaling to the destination station a telephone number of the user;

at the destination station, generating a message containing a telephone number of the destination station and sending said message;

receiving said message and inserting the telephone number from said message into an entry in the store;

upon subsequent selection by the user of that entry in the store, setting up a telephone call from a user station to the destination station using said telephone number of the respective destination station;

upon receipt by the destination station of the subsequent call, translating said user telephone number into a data address for access means of the store and sending to said data address a request for additional data; and upon receipt, by said store access means, of said request, sending the additional data to the destination telephone equipment.

11. A method of operating a telecommunications system comprising:

a user accessing a store having a plurality of entries each containing an address;

upon selection by the user of an entry, setting up a call from telecommunications equipment of the user to destination telecommunications equipment identified by the address contained in the selected entry, said call signaling to the destination telecommunications equipment an address of the user;

wherein at least some of said entries also contain additional data, and the method further comprises:

upon receipt by the destination equipment of said call, translating said user address into a data address for access means of the store and sending to said data address a request for additional data;

upon receipt, by said store access means, of said request, sending the additional data to the destination telecommunications equipment.

12. A method of operating a telecommunications system, the method comprising:

enabling a user to access a store having a plurality of entries each formed of metadata including a respective address;

upon selection by the user of an entry, setting up a call between telecommunications equipment of the user and destination telecommunications equipment identified by the respective address of the metadata of the selected entry, said call signaling to the destination telecommunications equipment an address of the user, the metadata of at least some of said entries including respective additional data;

upon receipt by the destination telecommunications equipment of said signaling, causing said user address to be translated into a data address for access means of the store and sending to said data address a request for additional data;

upon receipt, by said access means of the store, of said request, sending to the destination telecommunications equipment the additional data.

13. A method according to claim 12, further comprising:

at the destination telecommunications equipment, causing a message containing additional data relating to the subject of said call to be generated and sent;

receiving said message; and updating the metadata of the selected entry to include said additional data relating to the subject of said call.

14. A method according to claim 13, wherein the message includes the address of the destination telecommunications equipment.

15. A method according to claim 12, wherein the translation is performed by sending, to a remote server, an enquiry message containing the address to be translated and receiving a reply message from the remote server.

16. A method according to claim 12, wherein the user uses a data terminal, located adjacent to said telecommunications equipment of the user, to access the store and select an entry therefrom.

17. A method according to claim 12, wherein the telecommunications equipment of the user includes a graphical user interface, the user having access to the graphical user interface to access the store and select an entry therefrom.

18. A method according to claim 12, wherein entries are translated by a speech synthesizer into audible form and transmitted to the telecommunications equipment of the user, and the user is able to select an entry by means of a keypad or via a speech recognizer.

19. A method of operating a telecommunications system, the method comprising:

enabling a user to access a store having a plurality of entries each formed of metadata including a respective address;

upon selection by the user of an entry, setting up a call between telecommunications equipment of the user and destination telecommunications equipment identified by the address contained in the selected entry, said call signaling to the destination telecommunications equipment an address of the user, the metadata of at least some of said entries including respective additional data;

upon selection by the user of the entry, sending the address contained in the selected entry to a translation service to be translated into a data address for the destination telecommunications equipment and upon receipt of the resulting data address from the translation service, sending the additional data to said data address; and at the destination telecommunications equipment, causing the additional data to be associated with the incoming call.

20. A method of operating a telecommunications system, the method comprising:

enabling a user to access a store having a plurality of entries each formed of metadata including a respective address;

upon selection by the user of an entry, setting up a call between telecommunications equipment of the user and destination telecommunications equipment identified by the address contained in the selected entry, said call signaling to the destination telecommunications equipment an address of the user, the metadata of at least some of said entries including respective additional data;

upon selection by the user of the entry, causing the address contained in the selected entry to be translated into a data address for the destination telecommunications equipment and sending the additional data to said data address; and at the destination telecommunications equipment, causing the additional data to be associated with the incoming call;

at the destination telecommunications equipment, causing a message containing additional data relating to the subject of said call to be generated and sent;

receiving said message; and updating the metadata of the selected entry to include said additional data relating to the subject of said call.

21. A method according to claim 20, wherein the message includes the address of the destination telecommunications equipment.

22. A method of operating a telecommunications system, said telecommunications system including a store for storing, in respect of a user, a plurality of entries each formed of metadata including a respective address, and access means for use by the user in consulting the store and initiating the making of a telecommunications call between telecommunications equipment of the user and destination telecommunications equipment corresponding to a said respective address, the method comprising:

setting up a telecommunications call between telecommunications equipment of the user and destination telecommunications equipment, said call signaling to the destination equipment an address of the user;

causing the destination telecommunications equipment to generate and send a message containing an address of the destination telecommunications equipment;

receiving said message, creating an entry of the store, and including the address from said message as the respective address of the metadata of that created entry; and upon subsequent selection by the user of that created entry in the store, setting up a telecommunications call between telecommunications equipment of the user and the destination telecommunications equipment using the respective address of that created entry;

wherein said message contains additional data relating to the subject of the telecommunications call, and the creating of the entry includes the additional data in the metadata of that created entry, and further comprising:

upon establishment of the subsequent call made upon that subsequent selection by the user of that created entry, translating the user address signaled to the destination telecommunications equipment in the setting up of that subsequent call into a data address for said access means of the store and sending to said data address a request for additional data; and upon receipt, by said access means of the store, of said request, sending the additional data to the destination telecommunications equipment.

* * * * *